Figure 1:
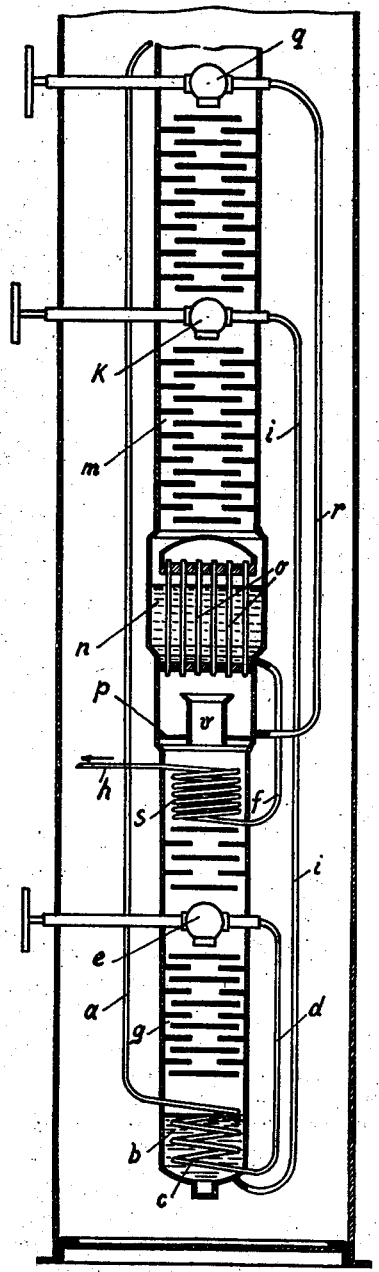

Patented Dec. 16, 1930

1,785,491

UNITED STATES PATENT OFFICE

ADOLF MESSER, OF FRANKFORT-ON-THE-MAIN, GERMANY

METHOD FOR THE COMPLETE SEPARATION OF LIQUID AIR INTO OXYGEN AND NITROGEN

Application filed February 18, 1927, Serial No. 169,400, and in Germany February 18, 1926.

In the method of obtaining oxygen by the separation of air into oxygen and nitrogen, said oxygen is conveyed in a liquid or gaseous form from the collecting vessel of the separation apparatus directly into a counter-current heat-exchanger wherein liquid oxygen is evaporated, and its cold given up to incoming compressed air.

If oxygen above the oxygen bath is withdrawn in the gaseous form, then it is impossible to obtain the same with a purity higher than 99% because the vapour is always richer in nitrogen than the liquid itself. Thus, for example, the composition of the vapour above a liquid with a composition of 99% oxygen and 1% nitrogen is 97.37% oxygen and 2.63% nitrogen, or that of the vapour above a liquid with 99.7% oxygen and .3% nitrogen is 99% oxygen and 1% nitrogen.

It is clear from this that where the oxygen is removed in gaseous form from the collecting vessel, it is impossible to produce oxygen of high per cent purity, that is oxygen of purity higher than 99% generally required in modern processes.

If, on the other hand, the oxygen is withdrawn from the collecting vessel in the liquid form, then the above mentioned disadvantages do not appear since the oxygen withdrawn has the same high percentage composition as the oxygen bath itself. The removal of the liquid from said bath is attended, however, by the loss of the total heat of evaporation present in the oxygen withdrawn from said bath. To this must be added the losses which result from the radiation of cold in the insulation of the apparatus. The utilization of this heat of evaporation in the oxygen bath is, however, particularly important in separation apparatus with several air-separation operations wherein nitrogen under pressure is re-liquefied by means of liquid oxygen. Complete separation of the oxygen and nitrogen so that both gases are produced with a minimum purity of 99% can be obtained only when sufficient nitrogen vapour under pressure is re-liquefied, since in this case only can sufficient washing nitrogen be delivered to the uppermost column which is subjected to suction.

As is known, the quantity of oxygen evaporated in practical operation in an oxygen bath is not sufficient for the complete liquefaction of sufficient washing nitrogen when the oxygen is withdrawn in the liquid form, because the losses of cold to the outside are too great. If, on the other hand, the oxygen is withdrawn in the gaseous form, a sufficient quantity of nitrogen can be condensed because the quantity of oxygen evaporating is then greater by about 20%.

Apart from the disadvantage that the oxygen cannot be produced with a sufficiently high percentage purity, the withrawal of the oxygen in gaseous form is, however, accompanied by a further undesirable feature which resides in the danger of explosion in the air separation apparatus. In the past explosions have frequently occurred in two-column apparatus—that is, apparatus with double rectification—wherein the oxygen is withdrawn continuously in the gaseous condition from the evaporator, particularly when the apparatus is constructed as a pure nitrogen apparatus. Where, on the other hand, the oxygen, in two-column apparatus, leaves the evaporator in liquid form, explosions have never been observed, in spite of practical experience extending over a number of years. This is clearly because scavenging is effected continuously in the oxygen evaporator by the removal, in liquid form, of the oxygen, so that particles which might lead to explosive mixtures cannot settle. Hitherto to prevent explosions occurring in nitrogen-producing plant wherein the oxygen is removed in gaseous form from the evaporator, large quantities of liquid oxygen are withdrawn from the lowest part of the oxygen evaporator at intervals of a few hours, the object being to prevent the settling of explosive substances. This results in a not inconsiderable loss of cold and of energy expended without necessarily increasing the immunity from explosions.

The disadvantages mentioned above are obviated according to the invention by utilizing the entire heat of evaporation of the liquid oxygen for the recovery of liquid nitrogen by returning the former into the warmer part of the apparatus (pressure stage) where the gaseous nitrogen is condensed with the aid of the cold liberated on the evaporation of the liquid oxygen.

For this purpose the oxygen is conducted from the lowest part of the evaporator into a coil in the part of the two-column apparatus, subject to pressure. Inside this coil the entire liquid oxygen is evaporated by the temperature difference (about 4° C.), a corresponding quantity of nitrogen vapour under pressure being simultaneously condensed on the outside of the coil. In this manner the quantity of liquid washing nitrogen is increased by about 20%, corresponding to the quantity of oxygen withdrawn, and a sufficient quantity of liquid washing nitrogen is obtained for the upper column subject to suction. With this arrangement the temperature difference, which exists between the said parts of the air liquefying and separating plant is not fully utilized.

According to the invention full utilization is achieved by employing the liquid oxygen returned into the warmer part of the plant in such a manner that the oxygen leaves the plant finally at the temperature obtaining in the said part. This is effected, for example, by extending the coil, conveying the liquid oxygen in counter-current to the nitrogen vapour rising under pressure, to the vicinity of the pressure-reduction valve for the liquid air, and by causing the evaporated oxygen to emerge there. Whereas in the first explained method a temperature difference of about 4° C. only ($-182°$ to $-178°$ C.), that is from 50 to 60%, was utilized, it is, according to the invention, possible to utilize the entire temperature difference together with the evaporation heat of the oxygen.

Figure 2:
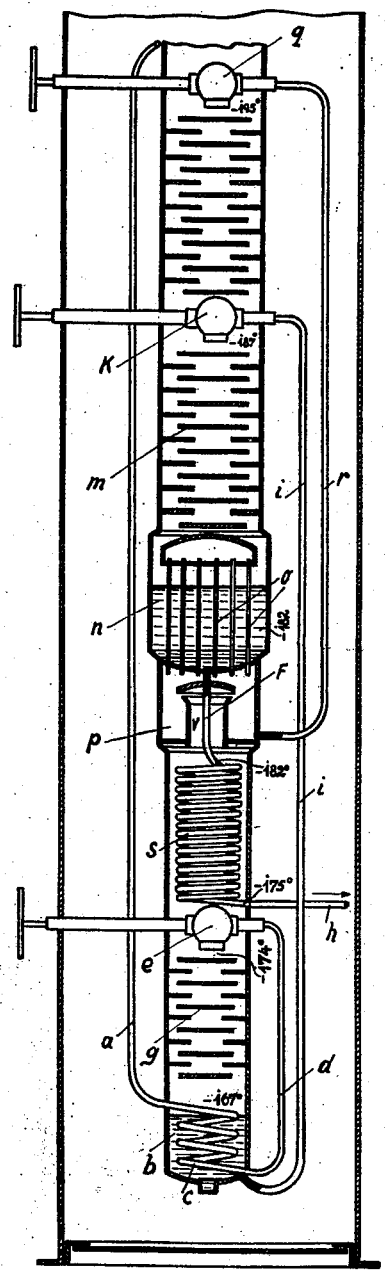

Figs. 1 and 2 of the drawings illustrate diagrammatically in longitudinal section two-column apparatus for carrying out the two methods.

In the apparatus illustrated in Fig. 1, precooled compressed air passes through a conduit $a$ into the lower part of the separation apparatus, flows through a heating coil $c$ in a bath $b$ of liquid rich in oxygen and through a conduit $d$ to the pressure-reduction valve $e$, whence it finally emerges into a liquid condition, flowing through the lower column $g$ in the lowest part of which a liquid rich in oxygen collects in the bath $b$. This liquid rich in oxygen is maintained boiling by the coil $c$ heated by the compressed air. The resulting vapours flow upwardly in the column $g$ and serve for the washing of the oxygen containing liquid air flowing down therein. The vapours formed above the separating column $g$ and flowing upwardly consist, depending on the pressure at which the column operates, mainly of nitrogen and to a less degree of oxygen. The liquid rich in oxygen is conducted from the bath $b$ through a conduit $i$ into the second column $m$ and is reduced to a lower pressure by a valve $k$. The liquid oxygen thus obtains a lower boiling point so that nitrogen-oxygen vapours rising in the first column condense in the interior of condenser tubes $o$ in a liquid oxygen bath $n$ (evaporator). The oxygen vapours condense first of all and partly run into the column $g$ and partly collect on a bottom $p$. The oxygen vapours in the column are washed in an increasingly thorough manner by the liquid oxygen mixture passing through the same until pure nitrogen is present in the tubes $o$ of the condenser. The said nitrogen, insofar as it is not required as washing liquid in the column, is collected in liquid form on the bottom $p$. From here the liquid nitrogen is conveyed through a pipe $r$ into the upper column and is reduced by a valve $q$ to a lower pressure. To this extent the two-column apparatus presents no novelty. The latter resides in the provision in the warmer lower part $g$ of a coil $s$, to which liquid oxygen is conveyed from the bath $n$ by the pipe $f$ and from which it is removed through the pipe $h$ after evaporating during its passage therethrough. The gaseous nitrogen flowing, subject to pressure, through the centre passage $v$ in the bottom $p$ passes over the exterior of the coil $s$ and is thus condensed by the cold liberated therein by the evaporation of the oxygen. In this manner, as stated above, the quantity of washing nitrogen in the upper column is added to.

In the device illustrated in Fig. 2 the liquid oxygen in the evaporator $n$ is at a temperature of $-182°$ C. At this temperature the liquid oxygen passes into the warmer part of the lower stage wherein, at the upper end, the temperature is that of pure nitrogen at 5 atmospheres, namely $-178°$. Since, therefore, the temperature in the uppermost zone of the lower pressure stage is $-178°$ and the nitrogen vapours rising under pressure from the column $g$ are, above the reducing valve $e$, at a temperature of about $-175°$, there is consequently a temperature drop of $7°$. To utilize this fully the bottom of the evaporator is made deeper or runs to a point towards the middle and the coil $s$, to which the liquid oxygen is conveyed from the evaporator by way of the pipe $f$, is extended into the vicinity of the pressure reducing valve $e$, so that the outlet end $h$ thereof is disposed in the zone at which the temperature is $-175°$. The liquid oxygen coming from a zone with a temperature of $-182°$ is continuously heated, evaporates ever more rapidly and thus gives up an increasing amount of cold, resulting in an increasing condensation of the oxygen contained in the rising vapours rich in nitrogen, said condensation being carried so far that pure nitrogen vapours are present at the upper end of the coil. Complete condensation of the oxygen contained in the rising nitrogen vapours is achieved since the quantity of oxygen evaporating in the coil $s$ is at least twice as great as the quantity of oxygen in the rising nitrogen vapours.

Due to the complete condensation of the oxygen a return flow of liquid nitrogen, to produce a rectification effect, through the column from the condenser tubes $o$, as in the first described method of operation, is not necessary. On the contrary the total quantity of nitrogen liquefied by the condensation effect is at disposal as washing nitrogen in the low pressure part of the apparatus.

The coil $s$ therefore partly replaces the rectification column otherwise usual in the pressure stage, the result being that considerably more washing nitrogen is at disposal in the upper column than when the lower stage is constituted by a pure rectification column.

What I claim is:—

1. The process of separating air into oxygen and nitrogen, which includes liquefying cold compressed air at the lower part of one column by indirect contact with liquid rich in oxygen, delivering said liquid air to the column, rectifying the last mentioned liquid by descent in the column from the point of admission to the place of indirect contact with the air to be liquefied, delivering the vapors rising from said point of liquid admission to two cooling zones in series to completely liquefy said vapors in two stages, returning the liquid from the first stage in contact with and countercurrent to the vapors rising from said point of liquid admission, withdrawing the liquid formed in said second zone, withdrawing liquid from the bottom of said column, and delivering both of said last mentioned liquids to a second column under lower pressure and at different elevations therein, vaporizing a portion of the liquid in the lower end of the second column by the liquefaction in the aforementioned second stage, withdrawing a further portion of said last mentioned liquid and vaporizing it to effect the cooling in the aforementioned first stage, withdrawing all of the vapor produced in said cooling of said first stage, and separately withdrawing all of the gas produced in said cooling of said second stage.

2. The process of separating air into oxygen and nitrogen, which includes maintaining two rectification columns under different pressures, delivering to the first and higher pressure column at a point intermediate the ends of the latter the liquid air which has been liquefied in the lower portion of said column through indirect contact with the liquid collecting in said lower portion, completely liquefying the vapors rising in the upper portion of said last mentioned column and in two successive stages, the liquid formed in the first stage being permitted to descend in said column, delivering to the second and lower pressure column at different elevations therein the liquid formed in said second stage and the liquid collecting in the bottom of said first mentioned column, the liquefaction of the vapors in the second stage being effected by indirect contact with the liquid collecting in the bottom of the second column, and the cooling of the vapors in the first stage being effected by indirect contact with liquid withdrawn from said body, and withdrawing all of the gases produced in cooling the first stage separate from the gases produced in cooling the second stage.

3. The process of separating liquid air into oxygen and nitrogen, which includes maintaining two rectification columns under different pressures, delivering to the higher pressure column at a point intermediate the ends of the latter the liquid condensed at still higher pressure by the liquid collecting in the bottom of said column, completely liquefying the vapors in the higher pressure column above the point of admission of said liquid, and in two successive stages, returning the liquid formed in the first stage to said column, delivering to the lower pressure column the liquid formed in the said second stage and the liquid collecting in the bottom of the higher pressure column, effecting the said liquefaction in the said two stages by the liquid collecting in the bottom of the lower pressure column, and withdrawing as entirely separate gases the separate vapors produced from the liquids used in cooling said first and second stages.

In testimony whereof I hereunto affix my signature.

ADOLF MESSER.